US005358786A

United States Patent [19]

Ishikawa et al.

[11] Patent Number: 5,358,786

[45] Date of Patent: Oct. 25, 1994

[54] ELECTRIC INSULATED WIRE AND CABLE USING THE SAME

[75] Inventors: Izumi Ishikawa; Isao Takahashi; Hideo Sunazuka; Akira Yoshino; Masatake Hasegawa; Motohisa Murayama, all of Tokyo, Japan

[73] Assignee: Fujikura Ltd., Tokyo, Japan

[21] Appl. No.: 50,988

[22] Filed: Apr. 22, 1993

Related U.S. Application Data

[63] Continuation of Ser. No. 648,169, Jan. 31, 1991, abandoned.

[30] Foreign Application Priority Data

Mar. 31, 1990 [JP] Japan ................................ 2-19165
May 23, 1990 [JP] Japan ................................ 2-133647

[51] Int. Cl.5 ........................ B32B 15/08; H01B 7/00

[52] U.S. Cl. .................................. 428/380; 428/383; 428/391; 174/110 R; 174/110 AR; 174/110 SR; 174/110 B; 174/120 AR; 174/120 SR

[58] Field of Search ............... 428/383, 380, 383, 391; 174/110 R, 120 R, 120 AR, 120 SR, 110 AR, 110 SR, 110 B

[56] References Cited

U.S. PATENT DOCUMENTS 4,384,944 5/1983 Silver et al. ........................ 428/383
4,515,992 5/1985 Gupta ................................ 428/380

FOREIGN PATENT DOCUMENTS 3821107 12/1989 Fed. Rep. of Germany ...... 428/283

*Primary Examiner*—Patrick J. Ryan
*Assistant Examiner*—Richard P. Weisberger
*Attorney, Agent, or Firm*—Cushman, Darby & Cushman

[57] ABSTRACT

The present invention relates to an insulated wire comprising a conductor and at least two insulating layers provided on the outer periphery of the conductor. The inner insulating layer is provided directly or via another insulation on the outer periphery of the conductor and comprises a polyolefin compound containing 20 to 80 parts by weight of at least one substance selected from ethylene $\alpha$-olefin copolymer, ethylene $\alpha$-olefin polyene copolymer ($\alpha$-olefin having the carbon numbers of $C_3$–$C_{10}$, polyene being non-conjugated diene). The outer insulating layer is made primarily of a heat resistant resin which contains no halogen and which is a single substance or a blend of two or more substances selected from polyamide, polyphenylene sulfide, polybutylene terephthalate, polyethylene terephthalate, polyether ketone, polyether ether ketone, polyphenylene oxide, polycarbonate, polysulfone, polyether sulfon, polyether imide, polyarylate, polyamide, or a polymer alloy containing such resin as the main component.

5 Claims, 4 Drawing Sheets

ELECTRIC INSULATED WIRE AND CABLE USING THE SAME

This is a continuation of application Ser. No. 07/648,169, filed on Jan. 31, 1991, which was abandoned.

BACKGROUND OF THE INVENTION

1. Field of the Invention

The present invention relates to insulated wire and cable made of such insulated wire and insulation suitable for use in vessels and aircrafts.

2. Description of Related Art

One example of prior art is disclosed in the specification of U.S. Pat. No. 4,521,485. The specification discloses an insulated electrical article which comprises a conductor, a melt-shaped inner insulating layer comprising a first organic polymer component and a melt-shaped outer insulating layer contacting said inner layer and comprising a second organic polymer component and which is useful for aircraft wire and cable. The inner insulating layer comprises a cross-linked fluorocarbon polymer or fluorine-containing polymer containing 10% by weight or more of fluorine fluorocarbon polymer being ethylene/tetrafluoroethylene copolymer, ethylene/chlorotrifluoroethylene copolymer, or vinylidene fluoride polymer. The outer insulating layer comprises a substantially linear aromatic polymer having a glass transition temperature of at least 100° C., the aromatic polymer being polyketone, polyether ether ketone, polyether ketone, polyether sulfone, polyether ketone/sulfone copolymer or polyether imide. The specification of U.S. Pat. No. 4,678,709 discloses another example of prior art insulated article which comprises a cross-linked olefin polymer such as polyethylene, methyl, ethyl acrylate, and vinyl acetate as the first organic polymer of the inner insulating layer.

According to the second example of prior art, the aromatic polymer used in the outer insulating layer must be crystallized in order to improve its chemical resistance. For such crystallization, cooling which follows extrusion of the outer layer at 240° C.~440° C. must be carried out gradually rather than rapidly. Alternatively, additional heating at 160° C.~300° C. must be conducted following extrusion. Such step entails a disadvantage that the cross-linked polyolefin polymer in the inner insulating layer becomes melted and decomposed by the heat for crystallization, causing deformation or foaming in the inner layer. If the outer layer is cooled with air or water immediately after extrusion thereof, melting or decomposition of the inner layer may be avoided but the outer layer remains uncrystallized. This leads to inferior chemical resistance, and when contacted with particular chemicals, the outer uncrystallized insulating layer would become cracked or melted. Use of a non-crystalline polymer such as polyarylate as the aromatic polymer of the outer insulating layer also provides unsatisfactory chemical resistance.

Further, the prior art insulation articles do not have sufficient dielectric breakdown characteristics under bending. Insulated articles having excellent flexibility, reduced ratio of defects such as pin holes, and excellent electric properties are therefore in demand.

SUMMARY OF THE INVENTION

The present invention aims at providing insulated electric wire having excellent electric properties, resistance to external damages, flexibility and chemical resistance, and cable using such wire.

In order to achieve the above mentioned objects, an insulated wire according to a first embodiment of the present invention comprises a conductor, an inner insulating layer which is provided directly, or via another layer of insulation, on the outer periphery of said conductor and which comprises a polyolefin compound containing 20 to 80 parts by weight of at least one substance selected from ethylene/α-olefin copolymer and ethylene/α-olefin/polyene copolymer (α-olefin having a carbon number of $C_3 \sim C_{10}$: polyene being non-conjugated diene) and an outer insulating layer which is provided on the outer periphery of the inner layer and which mainly comprises a heat resistant resin containing no halogen. The insulated wire of the above construction has improved resistance to deformation due to heat and is free from melting and decomposition at high temperatures as it contains 20~80 parts by weight of at least one substance selected from ethylene/propylene copolymer, ethylene/propylene/diene ternary copolymer, ethylene/butene copolymer, and ethylene/-butene/diene ternary copolymer or the like. Deformation and foaming of the inner insulating layer is also prevented when the aromatic polymer is extruded on the outer periphery of the inner insulating layer and crystallized by heating. The chemical resistance and resistance to deformation due to heating have been found to improve significantly if the heat resist resin containing no halogen is a single substance or a blend of two or more substances selected from polyamide as crystalline polymer, and polyphenylene sulfide, polybutylene terephthalate, polyethylene terephthalate, polyether ketone and polyether ether ketone as crystalline aromatic polymer, or a polymer alloy containing such resins, or the like as the main components. Use of a single substance or a blend of two or more substances selected from polyphenylene oxide, polycarbonate, polysulfone, polyether sulfon, polyether imide, polyarylate and polyimide, or a polymer alloy containing these resins, or the like as the main components as the non-crystalline aromatic polymer is found to improve the resistance to deformation due to heating. In some preferred embodiments of this embodiment, the inner insulating layer is also halogen free.

A second embodiment of the present invention comprises an insulated wire comprising a conductor and a three-layer structure comprising an inner layer, an intermediate layer and an outer layer provided directly, or via another insulation, on the conductor, each insulating layer being made of organic materials containing no halogen. The bending modulus of the inner and intermediate layers is smaller than 10,000 kg/cm$^2$ and that of the outer layer is greater than 10,000 kg/cm$^2$. The inner layer is made of materials that are different from those used in the intermediate layer. The melting point of the materials is selected to be below 155° C., or the glass transition point is selected to be below 155° C. in the case of materials having no melting point. The melting point of the outer layer is selected to be above 155° C., or the glass transition point is selected to be above 155° C. in the case of materials having no melting point. This particular structure provides remarkable improvement over the prior art of the dielectric breakdown characteristics under bending, flexibility, resistance to external damages and electric properties.

Insulated wire according to the first or second invention embodiments of the present is bundled or stranded in plurality and covered with a sheath to form a cable according to the present invention. As the insulated wire according to both the first and second embodiments have excellent flexibility, cable comprising such wire is also flexible and can be reduced in size. If flame-retardant materials such as polyphenylene oxide, polyarylate, polyether ether ketone and polyether imide are used for the outer layer of the insulated wire according to the second embodiment of the invention, the cable can be used as a flame-retardant cable. Use of a flame-retardant sheath containing metal hydroxides such as aluminum hydroxide or magnesium hydroxide further improves the fire-retardant performance of the cable containing no halogen.

DETAILED DESCRIPTION OF THE PREFERRED EMBODIMENTS

Preferred embodiments of the present invention will now be described in detail referring to the accompanying drawings.

Figure 1:
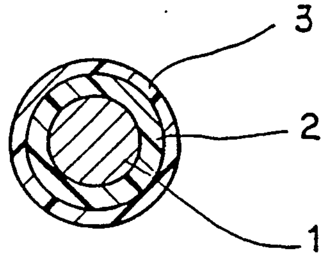
FIG. 1 is a cross sectional view of a preferred embodiment of an insulated wire according to a first embodiment of the present invention.

An embodiment of an insulated wire according to the present invention is shown in FIG. 1 and includes a conductor 1 which typically may be copper, copper alloy, copper plated with tin, nickel, silver, or the like. Conductor 1 can be either solid or stranded. An inner insulating layer 2 is provided on the outer periphery of the conductor 1 and comprises a polyolefin compound. An outer insulating layer 3 is provided on the outer periphery of the inner layer 2 and comprises as the main component a heat resistant resin containing no halogen. In some preferred embodiments, the inner insulating layer is also mainly halogen free. The inner layer 2 comprises a polyolefin compound which contains 20~80 parts by weight of at least one substance selected from ethylene/α-olefin copolymer and ethylene/α-olefin polyene copolymer (α-olefin having the carbon number of $C_3$–$C_{10}$; polyene being non-conjugated diene), and more specifically, ethylene/propylene copolymer, ethylene/propylene/diene ternary copolymer, and ethylene/butene copolymer. The inner layer 2 is provided directly or via another layer of insulation on the outer periphery of the conductor 1. As the diene component of the diene ternary copolymer contained in the polyolefin compound, 1.4-hexadiene, dicyclopentadiene, or ethylidene norbornene may be suitably used. The ratio of diene component as against ethylene propylene may be arbitrarily selected, but it is generally between 0.1 and 20% by weight. When the content of the copolymer is less than 20 parts by weight, it fails to exhibit the desired effect of preventing deformation due to heating or foaming at higher temperature of the present invention. If it exceeds 80 parts by weight, the hardness at room temperature becomes insufficient, making the insulated wire susceptible to deformation.

Cross-linked polyolefin compounds are preferably used to form the inner layer 2. Means of cross-linkage may be arbitrarily selected, but cross-linking by radiation curing is preferable. Because the polyolefin compound in the inner layer 2 contains 20~80 parts by weight of copolymer and is cross-linked, it remarkably prevents deformation, melting and decomposition of the insulated wire due to heat. By extruding an aromatic polymer onto the outer periphery of the inner layer 2 to form the outer layer 3 and by heating the same for crystallization, the inner layer 2 may be prevented from becoming deformed or from foaming. Heat resistant resin containing no halogen used as the main component of the outer layer 3 is preferably a single substance or a blend of two or more substances selected from those shown in Table 1 below, or a polymer alloy containing these resins as the main components.

TABLE 1

| Type | Name | Abbreviation | Bending Modulas (kg/cm$^3$) |
|---|---|---|---|
| Crystalline | polyamide | PA | 10000~25000 |
| Crystalline aromatic | polyphenylene sulfide | PPS | 20000~30000 |
| | polybutylene terephthalate | PBT | 20000~30000 |
| | polyethylene terephthalate | PET | 20000~30000 |
| | polyether ketone | PEK | 37000~47000 |
| | polyether ether ketone | PEEK | 35000~45000 |
| Non-crystalline aromatic | polyphenylene oxide | PPO | 20000~30000 |
| | polycarbonate | PC | 20000~30000 |
| | polysulfon | PSu | 22000~32000 |
| | polyether sulfon | PES | 21000~31000 |
| | polyether imide | PEI | 25000~35000 |
| | polyarylate | PAr | 13000~23000 |
| | polyimide | PI | 10000~35000 |

TABLE 2-1

| | Manufacturing Example | | | | | | Comparative Example | | | | |
|---|---|---|---|---|---|---|---|---|---|---|---|
| | 1 | 2 | 3 | 4 | 5 | 6 | 1 | 2 | 3 | 4 | Remarks |
| Inner insulating layer (cross-linked by electron beam irradiation | | | | | | | | | | | |
| polyethylene | 80 | 80 | 60 | 60 | 20 | 20 | 100 | 100 | 100 | 100 | (LDPE) |
| ethylene/propylene copolymer, (or ternary copolymer | 20 | | 40 | | 80 | | | | | | |

TABLE 2-1-continued

| | Manufacturing Example | | | | | | Comparative Example | | | | |
|---|---|---|---|---|---|---|---|---|---|---|---|
| | 1 | 2 | 3 | 4 | 5 | 6 | 1 | 2 | 3 | 4 | Remarks |
| of ethylene/ propylene/diene) | | | | | | | | | | | |
| ethyelene/butene copolymer, (or ternary copolymer of ethylene/ butene/diene) | | 20 | | 40 | | 80 | | | | | |
| Outer Insulating layer | | | | | | | | | | | |
| PEEK | 100 | | | | 100 | | 100 | | | | |
| PBT | | 100 | | | | 100 | | 100 | | | |
| PET | | | 100 | | | | | | 100 | | |
| PA | | | | 100 | | | | | | 100 | |
| Crystallization of outer insulating layer | Y | Y | Y | Y | Y | Y | Y | Y | N | N | |
| Foaming of inner insulating layer due to heating (180° C.) | N | N | N | N | N | N | Y | Y | Y | Y | |
| Deformation of inner insulation layer due to heating (120° C.) | N | N | N | N | N | N | Y | Y | Y | Y | (JIS C3005.25) |
| Chemical resistance of insulated wire | G | G | G | G | G | G | G | G | NG | NG | |

(Y: yes, N: no, G: good, NG: not good)

TABLE 2-2

| | Manufacturing Example | | | | | | Comparative Example | | | | |
|---|---|---|---|---|---|---|---|---|---|---|---|
| | 7 | 8 | 9 | 10 | 11 | 12 | 5 | 6 | 7 | 8 | Remarks |
| Inner insulating layer (cross-linked by electron beam irradiation | | | | | | | | | | | |
| polyethylene | 80 | 80 | 60 | 60 | 20 | 20 | 100 | 100 | 100 | 100 | (LDPE) |
| ethylene/propylene copolymer, (or ternary copolymer of ethylene/ propylene/diene) | 20 | | 40 | | 80 | | | | | | |
| ethyelene/butene copolymer, (or ternary copolymer of ethylene/ butene/diene) | | 20 | | 40 | | 80 | | | | | |
| Outer Insulating layer | | | | | | | | | | | |
| PPO | 100 | | | | 100 | | 100 | | | | |
| PC | | 100 | | | | 100 | | 100 | | | |
| PEI | | | 100 | | | | | | 100 | | |
| PAr | | | | 100 | | | | | | 100 | |
| Foaming of inner insulating layer due to heating (180° C.) | N | N | N | N | N | N | Y | Y | Y | Y | |
| Deformation of inner insulation layer due to heating (120° C.) | N | N | N | N | N | N | Y | Y | Y | Y | (JIS C3005.25) |

(Y: yes, N: no.)

The embodiment mentioned above is used in Manufacture Examples 1≈12 in Tables 2-1 and 2-2 to compare with comparative Examples 1≈8 for deformation, and foaming and chemical resistance.

In the examples of Tables 2-1 and 2-2, the conductor 1 used is a tin plated copper wire of 1 mm diameter, the inner layer 2 is of 0.2 mm and the outer layer 3 of 0.2 mm thickness respectively.

It has been found that heat resistance can be improved by addition of a hindered phenol antioxidant in an amount of 0.1∼5 parts by weight as against 100 parts by weight of the polyolefin compound constituting the inner layer 2. Particularly, the heat resistant characteristics (i.e. no decomposition, foaming or deformation) of the insulated wire is improved greatly when exposed to a very high temperature of 200 ° C. or above within a brief period of time. As hindered phenol antioxidants, those having a melting point above 80° C. are preferred. If the melting point is below 80° C., admixing characteristics of the materials are diminished. Antioxidants to be used for the above purpose should preferably contain fewer components the weight which decreases at temperatures above 200° C. When heated at the rate of 10° C./min in air, preferred antioxidants should preferably decrease in weight by 5% or less such as is the case with tetrakis-[methane-3-(3',5'-di-tert-butyl-4-Ohydroxy-phenol)-propionate] methane.

Table 3 compares the heat resistance of Manufacturing Examples 13∼18 (which include use of a hindered phenol antioxidant in the inner layer) with Comparative Examples 9∼12.

In any of the Manufacturing Examples mentioned above, the heat resistant resin containing no halogen which is used to form the outer layer 3 is preferably a single substance or a blend of two or more substances selected from those recited for use with outer layer in Table 1, or a polymer alloy containing these resins as the main components. Insulated wire with improved chemical resistance and less susceptibility to stress cracks can be obtained if the outer layer 3 is made of crystalline polymer and is treated for crystallization.

TABLE 3

| | Manufacturing Example | | | | | | Comparative Example | | | | |
|---|---|---|---|---|---|---|---|---|---|---|---|
| | 13 | 14 | 15 | 16 | 17 | 18 | 9 | 10 | 11 | 12 | Remarks |
| Inner insulating layer (cross-linked by electron beam irradiation | | | | | | | | | | | |
| polyethylene | 80 | 80 | 70 | | 60 | 20 | 80 | 80 | 80 | 100 | (LDPE) |
| ethylene/propylene copolymer, (or ternary copolymer of ethylene/propylene/diene) | 20 | | 30 | 100 | 40 | 80 | 20 | 20 | 20 | | |
| ethyelene/butene copolymer, (or ternary copolymer of ethylene/butene/diene) | | 20 | | | | | | | | | |
| hindered phenol antioxidant MP 120° C. | 1 | 0.1 | 1 | 5 | 1 | 2 | | | | 1 | |
| MP 65° C. | | | | | | | 1 | | | | |
| quinoline antioxidant MP 90° C. | | | | | | | | 1 | | | |
| phenylene diamine antioxidant MP 220° C. | | | | | | | | | 1 | | |
| Outer insulating layer | | | | | | | | | | | |
| PEEK | 100 | | | | 100 | | 100 | 100 | | | |
| PA | | 100 | | | | | | | | | |
| PPO | | | 100 | | | 100 | | | 100 | | |
| PEI | | | | 100 | | | | | | 100 | |
| Foaming of inner layer due to heating (220° C.) | N | N | N | N | N | N | N | Y | Y | Y | |
| Admixing property of material for inner insulating layer | G | G | G | G | G | G | NG | G | G | G | |

(MP: melting point, Y: yes, N: no, G: good, NG: not good)

Figure 2:
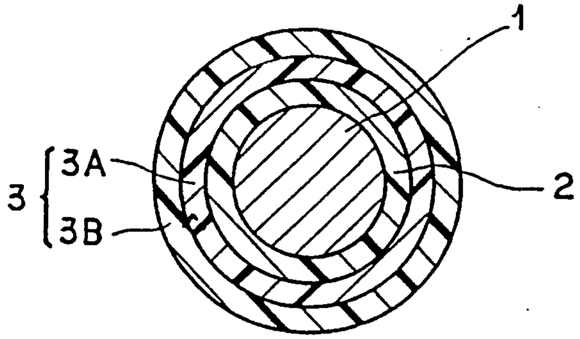
FIG. 2 is a cross sectional view to show another embodiment of an insulated wire according to the present invention.

Further, if polyether ether ketone is used for the outer layer 3, the heat resistance and chemical resistance is particularly improved because polyether ether ketone has a high melting point of 330° C. or higher and is thermally stable in the temperature range of from 100° to 300° C. Two or more layers of polyether ether ketone may be provided on the outer periphery of the inner layer 2. FIG. 2 shows an embodiment of insulated wire wherein the outer layer 3 of polyether ether ketone is formed in two layers (3A, 3B). The outer insulating layer 3A on the inside is coated onto the inner layer 2 by extruding polyether ether ketone or a mixture thereof with various additives such as a filler or an antioxidant. The outer insulating layer 3B on the outside is formed on top of the layer 3A in a similar manner. Crystallinity of polyether ether ketone constituting the layer 3A may be the same as or different from that of the layer 3B. If crystallinity of the two layers is different from each other, that of the layer 3A should preferably be lower than that of the layer 3B for the reasons described below. But the relation may be reversed. Further, decrease in the dielectric strength due to pin holes can be minimized inasmuch as those pin holes which are present, if any at all, occur at different locations in the two layers 3A, 3B, and the dielectric strength of the insulated wire improves when compared with the single-layer constructions.

Using the embodiment shown in FIG. 2, insulated wires of Manufacturing Examples 19 and 20 were obtained. A soft copper wire of 1 mm diameter was used as the conductor 1. A cross-linked polyolefin compound comprising 60 parts by weight of polyethylene and 40 parts by weight of ethylene/propylene/diene ternary copolymer was coated on the conductor 1 by extrusion to form the inner insulating layer 2.

Manufacturing Example 19

Outer insulating layer 3A which is 0.25 mm in thickness, made of polyether ether ketone having 30% crystallinity, was formed on the inner insulating layer 2.

The outer insulating layer 3B which is 0.25 mm in thickness, made of polyether ether ketone having 0% crystallinity, was formed on the outer insulating layer 3A.

Manufacturing Example 20

Outer insulating layer 3A which is 0.25 mm in thickness, made of polyether ether ketone having 0% crystallinity, was formed on the inner insulating layer 2.

The outer insulating layer 3B which is 0.25 mm in thickness, made of polyether ether ketone having 30% crystallinity, was formed on the outer insulating layer 3A.

Comparative Example 13

A single-layer structure made of polyether ether having 30% crystallinity and 0.5 mm thickness was formed on a soft copper wire of 1 mm diameter to obtain an insulated wire.

Insulated wires obtained in Manufacturing Examples 19 and 20 and Comparative Example 13 were evaluated for their AC short-time breakdown voltage and flexibility. Insulated wire was wound about round rods of predetermined diameters; flexibility is indicated as the ratio (d) of the minimum rod diameter at which no cracking occurred in the insulating layer to the wire diameter.

Results are shown in Table 4.

TABLE 4

| | Manufacturing Example | | Comparative Example |
|---|---|---|---|
| | 19 | 20 | 13 |
| AC short-time breakdown voltage (kV) | 45 | 45 | 39 |
| Flexibility | 1d | 1d | 2d |

As is evident from Table 4, insulated wire of the structure shown in FIG. 2 exhibits excellent flexibility and improved dielectric strength.

Figure 3:
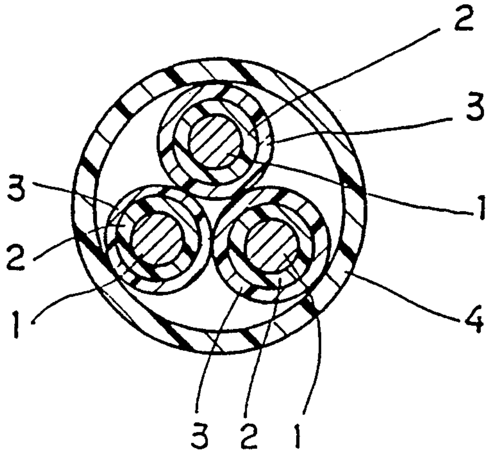
FIG. 3 is a cross sectional view of a cable utilizing the insulated wire shown in FIG. 1.
Figure 4:
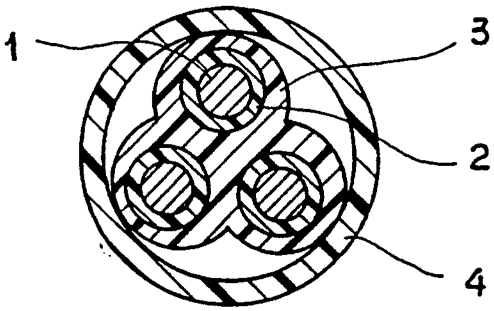
FIG. 4 shows a cross sectional view of the cable shown in FIG. 3 when its sheath is subjected to a flame.

A cable according to the present invention shown in FIG. 3 comprises a core made of a plurality of insulated wires that are bundled or stranded, and a sheath 4 covering the core. The sheath 4 is particularly made of a compound containing at least on component selected from ethylene acryl elastomer, ethylene/vinyl acetate copolymer, ethylene ethylacrylate copolymer, polyethylene, styrene ethylene copolymer, and butadiene styrene copolymer. Compounds containing ethylene acryl elastomer as the main component are particular preferable. It is also preferable that the sheath 4 is made of cross-linked materials. If the melting point (Tm) (or glass transition temperature (Tg) in the case of materials with no melting point) of the inner layer 2 is below 155° C., and Tm (or Tg in case of materials with no Tm) of the outer insulating layer 3 exceeds 155° C. and the sheath materials is cross-linked, the outer insulating layers 3 of insulated wires forming the core bundle become fused when the sheath is subjected to a flame, as shown in FIG. 4, and the fused wire will shut out the gas (such as $H_2O$, $No_2$, CO and $CO_2$). The heat capacity of the core bundle of fused and integrated wires will increase to make it difficult to burn the core bundle. This prevents the conductors 1 of insulated wires from contacting one another and short-circuiting. Admixtures containing metal hydroxides such as $Mg(HO)_2$ are suitable for the sheath 4 to improve fire retardant properties.

In Manufacturing Examples 21 through 23 and Comparative Examples 14 through 17 shown in Table 5, a mixture containing 100 parts by weight of ethylene acryl elastomer and 30 parts by weight of magnesium hydroxide ($Mg(OH_2)$) was cross-linked and used as the sheath 4. An organic polymer Tm (or Tg in case of polymers with no Tm) of below 155° C. was used as the inner insulating layer 2, and an organic aromatic polymer having Tm (or Tg in case of polymers with no Tm) of higher than 155° C. was used as the outer insulating layer.

TABLE 5

| | Manufacturing Example | | | Comparative Example | | | |
|---|---|---|---|---|---|---|---|
| | 21 | 22 | 23 | 14 | 15 | 16 | 17 |
| inner layer cross-linked polyolefin *1 (thickness mm) | 0.5 | 0.5 | 0.5 | 0.5 | | | |
| outer layer | | | | | | | |
| PPO (thickness mm) | 0.5 | | | | 1.0 | | |
| PC (thickness mm) | | 0.5 | | | | 1.0 | |
| PEEK (thickness mm) | | | 0.5 | | | | 1.0 |
| Sheath (thickness mm) | 1 | 1 | 1 | 1 | 1 | 1 | 1 |
| IEEE 383 VTFT length of damage (cm) | 120 | 100 | 110 | 180 | 90 | 100 | 100 |
| Time for CTC short-circuiting of the wires in VTFT *2 (CTC 1.000 V) (min.) | 20 | 18 | 22 | 5 | 8 | 10 | 11 |

*1 blend of LDPE60PHR and EPDM40PHR
*2 core to core

Figure 5:
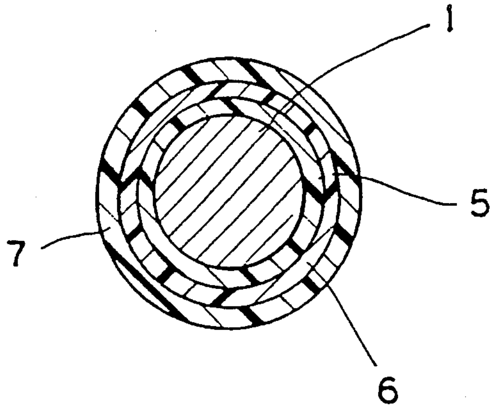
FIG. 5 shows a cross-sectional view of an embodiment of an insulated wire having an intermediate layer according to a second embodiment of the present invention.

The insulated wire according to the second embodiment of the invention shown in FIG. 5 comprises a conductor 1, and a three-layer structure of an inner insulating layer 5, an intermediate insulating layer 6 and an outer insulating layer 7 which is provided on the outer periphery of the conductor 1, each layer being made of a substance that contains no halogen. The bending modulus of the inner and intermediate layers 5 and 6 is smaller than 10,000 $kg/cm^2$. and that of the outer layer 7 is greater than 10,000 $kg/c^2$. The layers 5 and 6 are made of different materials which have either melting points (or glass transition points in the case of materials with no melting point) of below 155° C. The melting point (or glass transition point in case of materials with no melting point) of the outer layer 7 exceeds 155° C. Insulated wire of this construction is excellent in flexibility and resistance to external damages, and has improved dielectric strength under bending as well as electric characteristics. This is explained by the facts that (1) the outer layer 7 which is less susceptible to deformation protects the inner insulating layer 5 against external damages; (2) the three-layer structure with the above mentioned combination of bending moduli give satisfactory flexibility of the insulated wire; and (3) because the intermediate layer 6 protects the inner layer 5 from deterioration by heat at the surface even if the layer 7 is made of a material having a high melting point. Because the inner and the intermediate layers are made of different materials, electrical failure would not propagate into the layer 5, thus thereby improving the electric characteristics of the wire as a whole.

More specifically, the inner layer 5 is preferably a single substance or a blend of two or more substances selected from olefin base polymers such as polyethylene, polypropylene, polybutene-1, polyisobutylene, poly-4-methyl-1-pentene, ethylene/vinyl acetate copolymer, ethylene/ethylacrylate copolymer, ethylene/-propylene copolymer, ethylene/propylene/diene ternary copolymer, ethylene/butene copolymer, and ethylene/butene/diene ternary copolymer and the like. The layer 5 preferably contains 20~80 parts by weight of at least one substance selected from ethylene/α-olefin copolymer and ethylene/α-olefin/polyene copolymer (α-olefin having the carbon number of $C_3$–$C_{10}$; polyene being a non-conjugated diene), particularly ethylene/propylene copolymer, ethylene/propylene/-diene ternary copolymer and ethylene/butene copolymer. These are preferably cross-linked. As the method of cross-linking, a suitable amount of organic peroxide such as dicumyl peroxide and t-butylcumyl peroxide may be added to said polyolefin, and the mixture may be extruded and heated. Said polyolefin may be coated by extrusion and subjected to radiation curing. A silane compound such as vinyl trimethoxy silane, vinyl triethoxy silane, vinyl tris(β-methoxy, ethoxy) silane and an organic peroxide may be mixed to the polyolefin to obtain polyolefin containing grafted silane, which in turn may be coated by extrusion and cross-linked in air or in water.

Radiation curing may be conducted after the intermediate and the outer layers are provided on the inner insulating layer. To the olefin base polymer constituting the inner layer 5 may be added 0.1 to 5 parts by weight of a hindered phenole base antioxidant as against 100 parts by weight of the polymer. The inner layer 5 may be made of an admixture containing silicone polymer, or a mixture containing polyolefin and silicone.

Silicone polymer, urethane polymer, thermoplastic elastomers containing such as polyolefin and urethane groups, and ionic copolymer such as ionomer may be suitably used for the intermediate layer 6. More specifically, silicone polymers of the addition reaction type, and still more specifically solvent-free varnish type are preferable. Isocyanates containing no blocking agent are preferable. Isocyanates containing no blocking agent are preferable as urethane polymer, because they produce little gas during the reaction. Thermoplastic elastomers exemplified above are suitable because of their high heat resistance. Ionomers are suitable as ionic copolymer. Heat resistance of the insulated wire improves if cross-linking of the intermediate layer 6 is effected simultaneously with the radiation curing of the inner layer 5.

Substances listed in Table 1 are suitably used for the outer insulating layer 7.

The insulated wire shown in FIG. 5 comprises a conductor which can be either solid or stranded, made of copper, copper alloy, copper plated with tin, nickel, silver, or the like, and an inner insulating layer 5 provided on the outer periphery thereof and comprising cross-linked polyolefin. Although the inner layer 5 is directly provided on the conductor 1 in the figure, other insulation may be interposed therebetween. The layer 5 preferably is 0.1–1 mm thick. The cross-linked polyolefin in the particular embodiment shown in FIG. 5 is polyethylene or ethylene/propylene/diene copolymer (EPDM).

An intermediate layer 6 comprising a silicone polymer, urethane polymer or ionomer of about 0.001–0.5 mm thickness is provided on the outer periphery of the inner layer 5 in the particular embodiment of FIG. 5. Silicone polymers used may include silicone rubber and silicone resin of an addition reaction type.

An outer layer 7 of 0.05≈1 mm thickness is provided on the intermediate layer 6. Polyamide, polyether ether ketone, polyphenylene oxide or polyether imide was used for the outer layer 7 of the particular embodiment of FIG. 5.

Table 6 compares Manufacturing Examples 25 through 30 of insulated wires having the three-layer structure with Comparative Examples 18 through 20. In Table 6, O denotes that the evaluation was good, and X denotes that the evaluation was not good.

TABLE 6

| | bending modulus ($Kg/cm^2$) ASTM D 790 | glass transition point (°C.) | melting point (°C.) | Manufacturing Example 24 | 25 | 26 | 27 | 28 | 29 | 30 | Comparative Example 18 | 19 | 20 |
|---|---|---|---|---|---|---|---|---|---|---|---|---|---|
| Conductor (mm) | | | | 1 | 1 | 1 | 1 | 1 | 1 | 1 | 1 | 1 | 1 |
| Inner insulating layer (0.2 mm) | | | | | | | | | | | | | |
| LDPE | 500 | | 105 | 70 | 70 | 70 | | | | | 70 | | 100 |
| HDPE | 8000 | | 130 | | | | 60 | 60 | 60 | | | | |
| EPT | 300 | — | — | 30 | 30 | 30 | 40 | 40 | 40 | | 30 | | |
| silicone polymer | 300 | | | | | | | | | 100 | | | |
| PEI | 30600 | | | | | | | | | | | 100 | |
| Intermediate insulating layer (0.1 mm) | | | | | | | | | | | | | |
| silicone | 300 | — | — | 100 | | | 100 | | | | | | 100 |
| ionomer | 3800 | — | 96 | | 100 | | | 100 | | 100 | | | |
| thermoplastic ursthane | 450 | — | — | | | 100 | | | 100 | | | 100 | |
| Outer insulating layer (0.2 mm) | | | | | | | | | | | | | |
| PA | 11000 | 60 | 265 | | | | 100 | | | | | | |
| PEEK | 39800 | 143 | 334 | 100 | | | | 100 | | | | | |
| PEI | 30600 | 217 | — | | 100 | | | | 100 | | 100 (0.3 mm) | | |
| PPO | 25000 | 210 | — | | | 100 | | | | 100 | | 100 | |
| LDPE | 500 | — | 105 | | | | | | | | | | 100 |
| Flexibility of wire | | | | ○ | ○ | ○ | ○ | ○ | ○ | ○ | ○ | X | ○ |
| Deformation due to | | | | ○ | ○ | ○ | ○ | ○ | ○ | ○ | ○ | ○ | X |

TABLE 6-continued

| | bending modulus (Kg/cm$^2$) ASTM D 790 | glass transition point (°C.) | melt-ing point (°C.) | Manufacturing Example | | | | | | | Comparative Example | | |
|---|---|---|---|---|---|---|---|---|---|---|---|---|---|
| | | | | 24 | 25 | 26 | 27 | 28 | 29 | 30 | 18 | 19 | 20 |
| heating (130° C.) | | | | | | | | | | | | | |
| Dielectric breakdown voltage of linear specimen in air (KV) | | | | 48 | 45 | 46 | 42 | 49 | 48 | 44 | 43 | 42 | 41 |
| Dielectric breakdown voltage of bending specimen at ×10 diameter after immersion for 1 day in water at 90° C. (KV) | | | | 40 | 40 | 38 | 39 | 37 | 38 | 37 | 22 | 16 | 35 |
| Dielectric breakdown time under 6 KV load in water at 90° C. (hr) | | | | 1052 | 1120 | 1300 | 1060 | 1350 | 1880 | 2060 | 448 | 41 | 1610 |
| Resistance to external damage | | | | ○ | ○ | ○ | ○ | ○ | ○ | ○ | ○ | ○ | X |

Because of the unique three-layer structure, insulated wires of Manufacturing Examples 24 through 30 shown in Table 6 are thin as a whole despite the three layers of insulation and have excellent flexibility and reduced defect ratios such as arise from the presence of pin holes.

Certain tests or evaluation reported in Table 6 are explained below. In the test entitled, "Dielectric breakdown voltage of linear specimen in air" a high voltage is applied on a conductor 80 of an insulated wire 81, shown in FIG. 7. Water 82 in the tank 84 is grounded to measure the dielectric voltage of the insulated wire 81. Voltage is gradually increased at the rate of 500 V/sec starting from OV until dielectric breakdown occurs.

Figure 6:
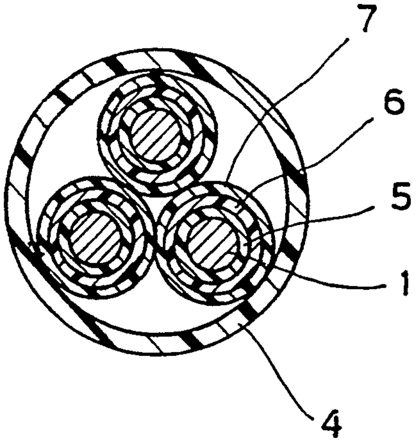
FIG. 6 shows a cross sectional view of a cable comprising the insulated wire shown in FIG. 5.
Figure 7:
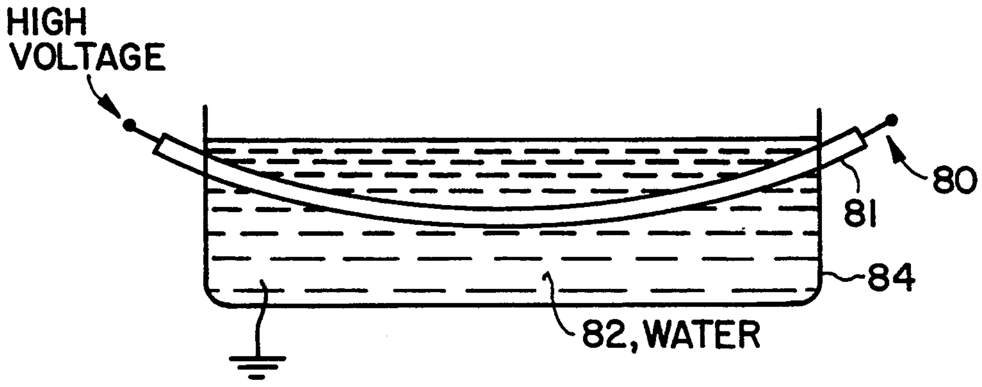
FIG. 7 shows, schematically, apparatus for a dielectric breakdown test.
Figure 8:
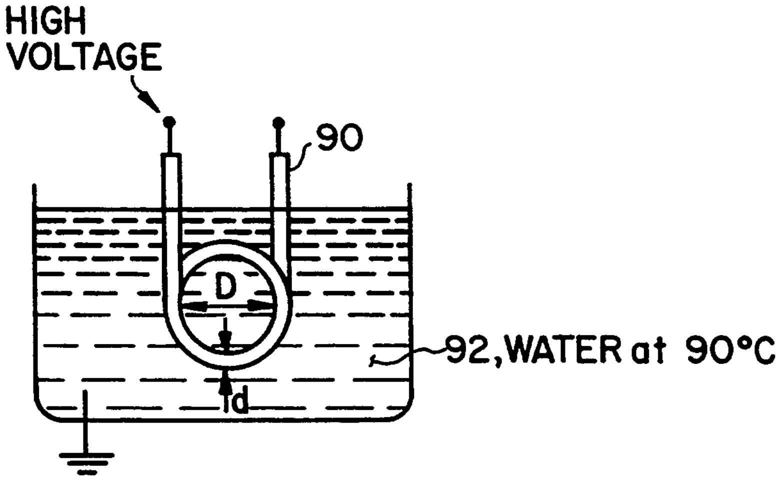
FIG. 8 shows, schematically, apparatus for a dielectric breakdown test of bent specimens in water.

In the test entitled, "Dielectric breakdown voltage of bending specimen at ×10 diameter after immersion for one (1) day in water at 90° C." referenced in FIG. 6, an electric wire 90 is bent to form a circle immersed in water 92 as shown in FIG. 8 at 90° C. for one day. Subsequently, dielectric breakdown voltage is measured as it was in the test discussed above in conjunction with FIG. 7. The curvature of ×10 diameter means that the wire 90 is bent so that the diameter D of the circle equals 10 times the diameter d of the insulated wire.

In the test referenced in Table 6 entitled, "Dielectric breakdown time under 6 KV load in water at 90° C.," a linear specimen of insulated wire immersed in water as shown in FIG. 7 is used as is discussed in conjunction with FIG. 7. However, the test is varied in that the water temperature is maintained at 90° C. and the duration of time until dielectric breakdown occurs is measured under a constant load of 6 6 KV.

In the three-layer structure having the intermediate insulating layer 6, the outer insulating layer 7 can also be formed by using polyether ether ketone as the materials in multi-layers similar as in the two-layer insulated wire. Each layer of polyether ether ketone constituting the outer insulating layer 7 may have a crystallinity different from any of the others. The inner layer of the two-layer polyether ether ketone layer can be made amorphous and the outer layer crystalline, or vice versa.

A plurality of insulated wires having such intermediate layer 6 may be bundled or stranded to form a core bundle, on which may be provided a sheath 4 comprising one substance selected from ethylene acryl elastomer, ethylene vinyl acetate, ethylene ethylacrylate, polyethylene, styrene ethylene copolymer, and butadiene styrene copolymer as the main component. It is preferred that such sheath materials are cross-linked.

When the sheath material is cross-linked, resistance to deformation due to high temperature heating and resistance to flame will improve.

Cables were made using the insulated wires according to the first and the second embodiments of the present insertion described herein. Totally unexpected and very interesting effects were obtained when the sheath materials containing 20–150 parts by weight of metal hydroxide, 50–95 parts by weight of ethylene/acryl elastomer, and 5–50 parts by weight of ethylene ethylacrylate copolymer was extruded to cover the cables.

When the insulated wire was heated externally by flame at 815° C., the sheath would retain its shape up to the sheath temperature of 350°–700° C. When the temperature exceeded 700° C., the sheath became significantly deformed at portions under the flame. However, the stranded or bundled insulated wire inside the sheath were protected from the flame as the outermost layer of polymer would become fused at above 350° C. thereby fusing and bonding the wires. IEEE 388 Vertical Tray Flame Test (VTFT) demonstrated that the wires according to the present invention have excellent properties.

What is claimed is:

1. An insulated wire comprising:

a conductor;

an inner insulation layer having a thickness of from 0.1 mm to 1 mm and comprising a halogen-free polymer provided directly on, or via another insulation on the outer periphery of said conductor, said inner insulation layer having a bending modulus of less than 10,000 Kg/cm$^2$m;

an intermediate insulation layer having a thickness of from 0.001 mm to 0.5 mm and comprising a second halogen-free polymer being provided on said inner insulation layer, said intermediate insulation layer having a bending modulus less than 10,000 Kg/cm$^2$m, said first and second halogen-free polymers being different from each other but having a melting point (or glass transition point in the case of polymers with no melting point) below 155° C.; and an outer insulation layer having a thickness of from 0.05 mm to 1 mm and comprising a third halogen-free polymer being provided on said intermediate insulation material, said outer insulation layer having a bending modulus greater than 10,000 $Kg/cm^2$, said third halogen-free polymer having a melting point (or glass transition point in the case of polymers with no melting point) of above 155° C, wherein said third halogen-free polymer comprises at least one heat-resistant, halogen-free resin selected from the group consisting essentially of polyether ketone, polyether ether ketone, polybutylene terephthalate, polyphenylene sulfide, polyethylene terephthalate, polyphenylene oxide, polycarbonate, polysulfone, polyether sulfone, polyether imide, and polyarylate or polyamide with at least one said resin from said group or a polymer alloy containing such resins as the main component.

2. The insulated wire as claimed in claim 1 wherein said inner insulating layer is made of a mixture containing polyolefin and/or silicone polymer.

3. The insulated wire as claimed in claim 1 wherein the inner insulating layer is made of an olefin compound containing 20–80 parts by weight of at least one substance selected from ethylene $\alpha$-olefin copolymer or ethylene $\alpha$-olefin polyene copolymer ($\alpha$-olefin having carbon numbers of $C_3$–$C_{10}$, polyene being non-conjugated diene).

4. The insulated wire as claimed in claim 1 wherein said intermediate insulating layer is made of a mixture containing at least one substance selected from silicone polymer, urethane polymer, thermoplastic elastomer and ionic copolymer.

5. The insulated wire as claimed in claim 1 wherein 0.1 to 5 parts by weight of an antioxidant of hindered phenol base is added to 100 parts by weight of the polyolefin compound constituting the inner insulating layer.

* * * * *